Patented July 1, 1924.

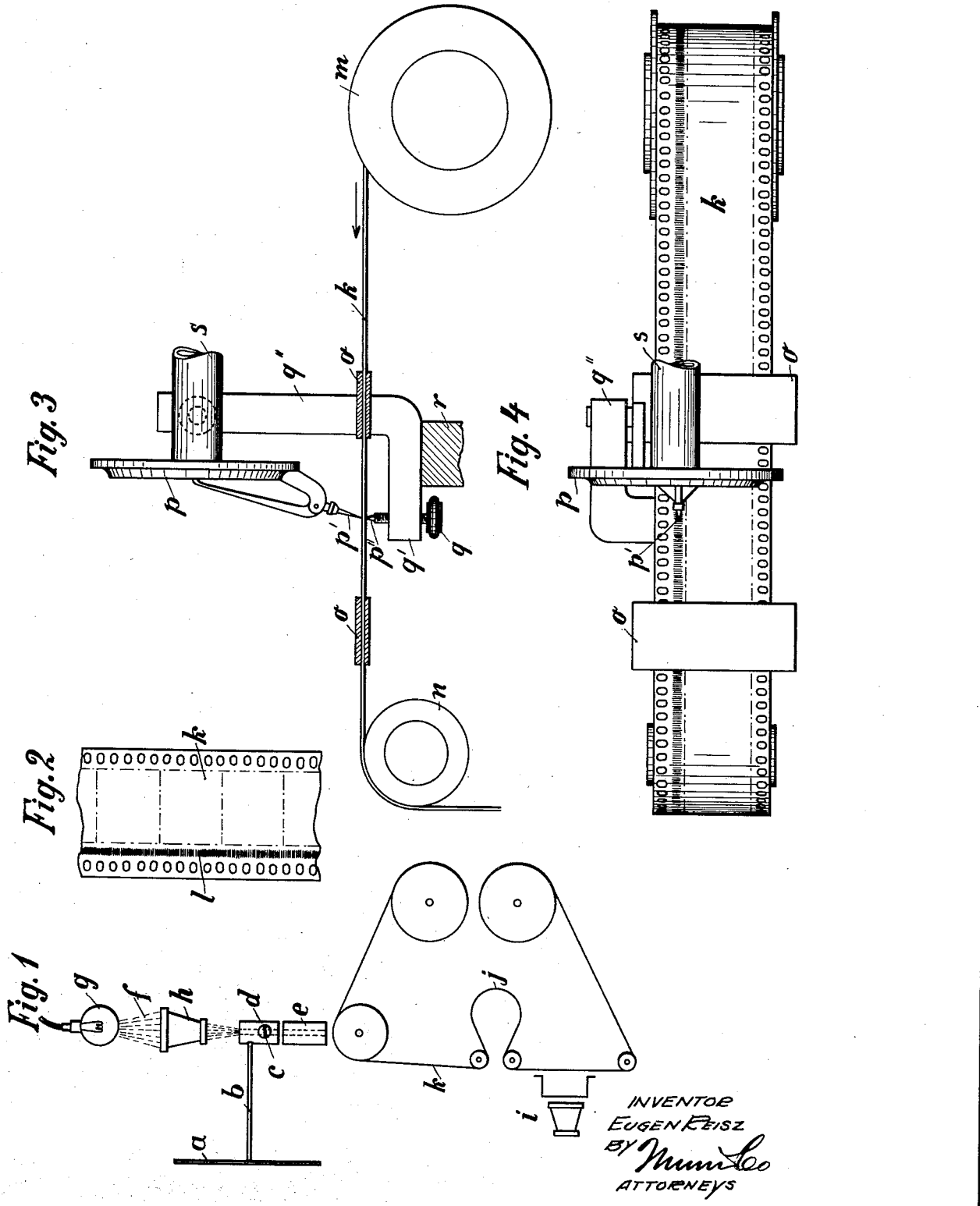

1,500,037

UNITED STATES PATENT OFFICE.

EUGEN REISZ, OF ZEHLENDORF-MITTE, GERMANY.

METHOD AND APPARATUS FOR PRODUCING MOVING PICTURES AND SOUND WAVES AT THE SAME TIME.

Application filed May 25, 1921. Serial No. 472,616.

(GRANTED UNDER THE PROVISIONS OF THE ACT OF MARCH 3, 1921, 41 STAT. L., 1313.)

*To all whom it may concern:*

Be it known that I, EUGEN REISZ, a citizen of Hungary, and a resident of Zehlendorf-Mitte, Germany, have invented a new and Improved Method and Apparatus for Producing Moving Pictures and Sound Waves at the Same Time (for which I have filed application in Germany, January 13, 1920; Italy, January 13, 1921; Great Britain, January 12, 1921; and Spain March 31, 1921), of which the following is a full, clear, and exact description.

This invention relates to a method and apparatus for producing sound vibrations in moving pictures on a single film, and has for an object the simultaneous taking and delivery of light pictures and sound waves by a photographic process in which the sound waves are changed into light vibrations and in which the photographic taking of these vibrations is made in such a form that it is possible to render the vibrations by a sounding box such as is used in the ordinary talking machine.

The process of taking, which is similar to the negative process in photography, is making use partly of devices already known in the art, and consists in the sound waves being taken by a membrane the vibrations of which regulate the direction of a bundle of rays of light. This bundle of rays falls, screened by a fixed screen, on a photographic plate or film which is moved regularly and which by being blackened in various degrees produces a record of the sound waves. The taking of the light pictures is effected on the same film, which is moved regularly but intermittently past the source of light for the pictures.

An apparatus suitable for the taking of pictures is shown in Figure 1.

Figure 2 illustrates a portion of the finished film.

Figure 3 shows a side view of an apparatus suitable for rendering the sound waves by means of a sound box.

Figure 4 is a top view of the apparatus shown in Figure 3.

As shown in the drawings, the invention comprises a membrane or other suitable diaphragm for receiving the impression of sound waves and is connected by a rod *b* to a screen *d* supported from a shaft *c*. A fixed screen *e* is placed below and opposite the screen *d*, so that the rays of light *f* come from a source of light *g* and concentrated by the lens system *h* make, according to the position of the movable screen *d*, black marks of various thickness on the film *k* which is moved regularly in the direction of the arrow. If the openings of the screen are formed by narrow and rectangular slits, after the developing, pictures of the sound in the form of more or less black lines *l*, shown in Figure 2, are arranged together in a row adjacent the portions of the film ordinarily occupied by the moving pictures.

As for the reproducing of the sound waves later, it is only required that each line have a width of from one to two millimeters, the other part of the film being used for taking the moving pictures. The taking of moving pictures is effected by the lens combination or objective *i*. The jerking movement of the film required thereof is changed to a regular movement as required for the taking of the sound waves by means of the insertion of a loop of the film *j*, as shown in Figure 1.

In developing the film especial attention has to be paid that the picture of the sound waves forms a contrast. Pictures developed too weak or too strong can be corrected later in a positive process. For the rendering of the pictures by the positive process a second film is used, which has no emulsion of silver salt and the gelatine layer of which, by immersion in a solution of ammonium or calcium chromate, is changed to a chrome gelatine sensitive to the light. When the negative film is copied on this chrome gelatine film, by throwing light on the films placed one on the other, and by treating them later in warm water, relief pictures are obtained, so that the more or less black spots correspond with the more or less raised or embossed parts of the positive.

The film treated in this way is now dipped in a rather concentrated dye solution, for instance aniline dye, until the pictures appear sufficiently strong by contrast, after which they are washed in water which is slightly acidified and then dried. By the use of the dye solution the pictures are not only made visible but, also, the relief is made more pronounced because the gelatine has taken up the dye. Films made according to this process give very clear pictures since the grain, which is otherwise formed by the extraction of the silver, is substantially eliminated by this method.

The projection of the pictures and the sound waves is effected by projecting, as regards the picture part, in the usual manner; whereas the sound impressions are placed under the needle of the sound box whereby the movements of the needle caused by the relief parts of the film reproduce the sounds taken previously by the photographic process. The ribbon containing the sound waves runs from an unwinding drum $m$ through guiding slits $o$ on the transport roll $n$. This transport roll can be worked by a spring or motor or other suitable device when it is desired to project sound waves only, or the ribbon or film $k$ is pulled over the transport roll $n$ by the mechanism of the moving picture projection apparatus when it is desired to simultaneously produce sound waves and pictures. The sound box is represented by the letter $p$ having a needle $p'$. In moving the film $k$ in the direction of the arrow, the needle glides over the relief portions of the film and causes the membrane of the sound box to vibrate.

Another feature of the device is that the needle point $p'$, which is always a ball point, is placed opposite a second, somewhat larger ball point $p''$ which is made from some hard material, so that the ribbon passes between these two points. The screw $q$ which carries the mounting in the second ball point $p''$ is fixed on the arm $q'$, which is part of the support $q''$. This arm $q''$ rests on a support $r$, and it is not connected with the guiding slits $o$ nor with the transport roll $n$, in order to prevent the communication of vibrations caused by the movement of the film $k$ to the sound box. The needle $p'$ communicates to the membrane, therefore, only the vibrations caused by the recorded sound waves, whereby the air vibrations are conducted by the sound tube $s$ to the outside.

What I claim is:

1. The method herein described of producing a film for a moving picture talking machine, consisting in simultaneously taking the pictures and photographically producing sound indicating marks on one edge of a film, placing said film on a chrome gelatine film and subjecting the films to the action of light while in contact with each other, whereby the pictures and marks will be produced in relief on the chrome gelatine film, and then subjecting the film to the action of a coloring solution whereby portions of the film will be rendered opaque.

2. The method herein described of producing a film for a moving picture talking machine, consisting in simultaneously taking the pictures and photographically producing sound indicating marks on one edge of a film, placing said film on a chrome gelatine film and subjecting the films to the action of light while in contact with each other, whereby the pictures and marks will be reproduced in relief on the chrome gelatine film and then subjecting the film to the action of a concentrated dye solution.

EUGEN REISZ.